United States Patent [19]

Carlson

[11] Patent Number: 4,577,990

[45] Date of Patent: Mar. 25, 1986

[54] COAXIAL COUPLING AND LOCKING MECHANISM

[75] Inventor: Richard K. Carlson, Wilmette, Ill.

[73] Assignee: MPC Products Corporation, Skokie, Ill.

[21] Appl. No.: 559,978

[22] Filed: Jan. 26, 1984

Related U.S. Application Data

[62] Division of Ser. No. 381,950, May 26, 1982, Pat. No. 4,430,632.

[51] Int. Cl.[4] .......... B25G 3/00; F16B 7/18

[52] U.S. Cl. .......... 403/342; 403/307

[58] Field of Search .......... 403/342, 46, 307, 341; 285/354, 386

[56] References Cited

U.S. PATENT DOCUMENTS

| | | | |
|---|---|---|---|
| 925,901 | 6/1909 | Hardick | 403/46 |
| 1,069,916 | 8/1913 | Windsor | 285/386 X |
| 1,438,751 | 12/1922 | DesIsles | 403/341 X |
| 2,988,385 | 6/1961 | Foelster et al. | 285/354 X |
| 4,430,632 | 2/1984 | Carlson | 336/120 |
| 4,475,748 | 10/1984 | Ekman | 285/354 X |

FOREIGN PATENT DOCUMENTS

| | | | |
|---|---|---|---|
| 276499 | 10/1951 | Switzerland | 285/386 |

*Primary Examiner*—Andrew V. Kundrat

*Attorney, Agent, or Firm*—Niro, Scavone, Haller & Niro, Ltd.

[57] ABSTRACT

A coupling mechanism is disclosed for coaxially connecting a pair of connectable components, such as a pair of transducer assemblies each having a stator. A coupling ring is carried by one stator and engageable with the other for drawing the stators together axially in response to relative rotation of the coupling ring. First friction mechanism between the stators prevent relative rotation between the stators after the stators are aligned angularly to align the electrical zeros thereof. Second friction mechanism of lesser coefficient of friction between the coupling ring and the one stator permit relative rotation therebetween whereby the stators can be finally coupled by further rotation of the coupling member while the first friction means maintains the stators in zero electrical alignment. Subsequently, locking washers are fastened between the coupling ring and stators to permanently lock the stators in relative aligned position.

9 Claims, 6 Drawing Figures

FIG. 4
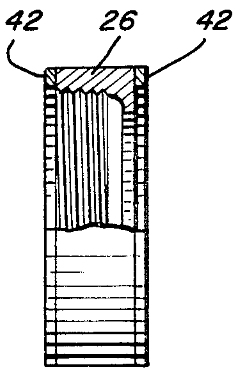
FIG. 5
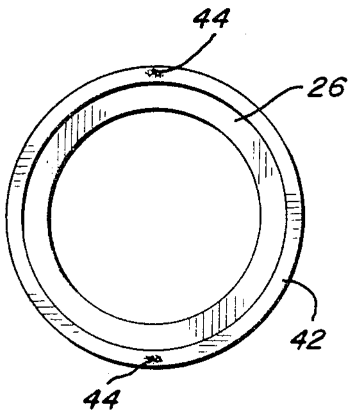
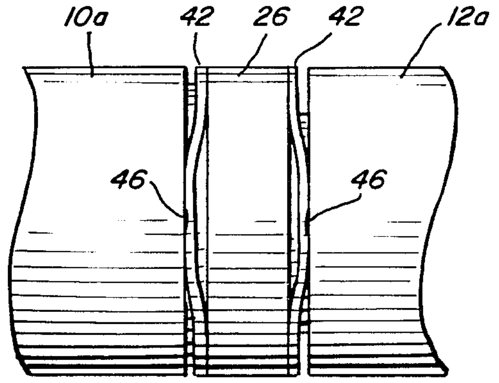
FIG. 6

COAXIAL COUPLING AND LOCKING MECHANISM

This application is a division of application Ser. No. 381,950, filed May 26, 1982, now U.S. Pat. No. 4,430,632.

BACKGROUND OF THE INVENTION

This invention relates generally to coaxial coupling mechanisms, and, more particularly, the invention relates to coupling means for coaxially connecting a pair of transducer assemblies, maintaining the electrical zero alignment thereof and permanently locking the transducer assemblies after proper alignment.

There are applications in which once coaxial connection of certain members are made, the angular alignment of the members becomes critical. One such application is in the area of transducer assemblies coupled in end-to-end coaxial disposition, where it often is critical that the stators of the coaxial transducer assemblies be precisely angularly aligned after alignment of the electrical zeros of each transducer assembly. Misalignment of such assemblies can lead to crucial errors in certain precision systems, such as airframe control systems, where multiple redundant transducers often are used to protect against the possibility that one or more of the transducers might fail. Thus, although it may be relatively easy to set the electrical zero of a single transducer in this type of application, problems are encountered when plural transducers must be coupled coaxially and aligned angularly to insure uniform electrical zeros across all of the transducers.

Many coaxial coupling mechanisms, such as coaxially coupling transducer assemblies, employ rotatable coupling members for drawing the connectable components together axially in coupled disposition. In the transducer assemblies, a rotatable coupling member in the form of a coupling ring is carried by one stator assembly of one transducer assembly and is engageable with the stator assembly of a coaxially coupled transducer assembly for drawing the assemblies together axially in response to rotation of the coupling ring. Unfortunately, although a coupling ring is quite convenient to use for this purpose, it is difficult to adjust and maintain the angular alignment of the coaxial stator assemblies as the ring is tightened.

Another problem encountered in coaxially coupled transducer assemblies and other systems subject to vibration and other potentially unloosening forces is the need for means for permanently locking the transducer assemblies in proper aligned and coupled disposition once the assemblies are fully coaxially coupled. Furthermore, it is often required that such permanent locking mechanisms not protrude outwardly beyond the peripheral bounds of the transducer assemblies or other systems, and that they be as simple and light as possible.

The present invention is directed to solving the above-identified problems relating to coupling, aligning and permanently locking coaxial connectable members, particularly coaxially connected transducer assemblies.

SUMMARY OF THE INVENTION

An object, therefore, of the present invention is to provide new and improved coupling means for coaxially connecting a pair of connectable members, such as transducer assemblies in proper angular alignment.

Another object of the invention is to provide means for readily and permanently locking the connectable members together after proper alignment and coupling.

A further object of the present invention is to provide coupling means and locking means of the character described, all of which are disposed entirely within the peripheral bounds of the connectable members or transducer assemblies.

In the exemplary embodiment of the invention, coupling means is provided for coaxially connecting a pair of transducer assemblies each having a stator. A coupling ring is rotatably mounted on one of the stators and is engageable with the other stator for drawing the stators together axially in response to rotation of the coupling ring. First means is provided between the stators for engagement in response to initial rotation of the coupling ring to prevent relative rotation between the stators after the stators are aligned angularly to align the electrical zeros thereof. Second means is provided between the coupling ring and the one stator to permit relative rotation therebetween whereby the stators can be finally coupled by further rotation of the coupling ring while the first means maintains the stators in proper zero electrical alignment.

As disclosed herein the first and second means described above comprise first friction means between the stators for enagement in response to initial rotation of the coupling ring, and second friction means between the coupling ring and the one stator. The first friction means has a higher coefficient of friction than the second friction means. Thus, the stators can be aligned angularly to align the electrical zeros thereof as the first friction means is drawn into engagement. The stator assemblies can be finally coupled by further rotation of the coupling ring overriding the lesser friction of the second friction means while the first friction means maintains the stators in proper zero alignment.

The first friction means comprises interfacing, roughened surface means on the end face of a hub portion on one of the stators and on the inner face of a recess in the other stator for receiving the hub portion. The second friction means comprises a wire ring for capturing the coupling ring on the hub portion of the one stator, the coupling ring having a smooth outer surface relative to the roughened interfacing surface means of the stators.

Another cooperating feature of the present invention comprises means for permanently locking the stators in their relative aligned and coupled position. More particularly, the locking means comprises an annular locking washer sandwiched between the coupling ring and each of the stators. Each washer is permanently fastened initially to either the coupling ring or the respective stator. After the stators are properly aligned and coupled or tightened, the washers are deflected and fastened to the other of the coupling ring or the respective stator to permanently lock the stators and the coupling ring together against any possibility of subsequent angular disturbance thereof. The washers are confined within the peripheral bounds of the transducer assemblies.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4 is a partial axial sectional view through the coupling ring, incorporating a pair of locking washers in accordance with the present invention;

FIG. 5 is an end view of the coupling ring and a locking washer of FIG. 4; and

FIG. 6 is a side elevational view of the coupling ring and locking washers of FIGS. 4 and 5 in permanent locking condition with a pair of mating transducer assemblies which are shown fragmented.

DESCRIPTION OF THE PREFERRED EMBODIMENT

Figure 1:
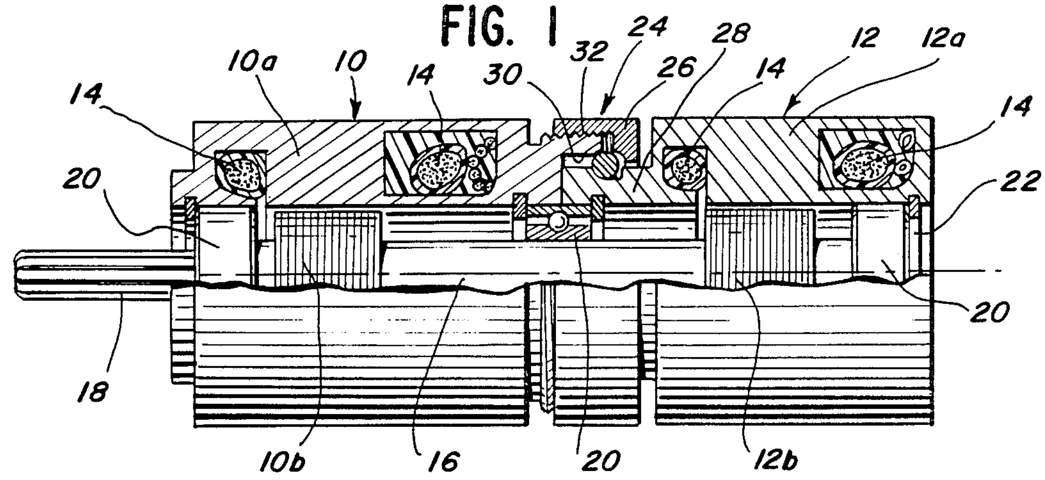
FIG. 1 is a partial, longitudinal sectional view axially through a pair of transducer assemblies coaxially connected by the coupling means of the present invention.

Referring to the drawings in greater detail and first to FIG. 1, the novel coupling means of the present invention is shown for use in an axially coupled rotary position-indicating transducer assembly which includes a pair of transducers, generally designated 10 and 12, coupled together in end-to-end coaxial disposition. Each transducer 10, 12 is similar to the extent that they each include a stator assembly 10*a* and 12*a*, respectively. Each stator assembly 10*a*, 12*a* includes wound electrical coil means 14. Each transducer assembly 10 and 12 also includes a rotor 10*b* and 12*b*, respectively, rotatably mounted within stator assemblies 10*a* and 12*a*, respectively. Rotors 10*b*, 12*b* are fixed on a rotatable shaft 16 having a spline connection 18 protruding from the left-hand end of transducer assembly 10. Shaft 16 is rotatably mounted within stator assemblies 10*a*, 12*a* by means of ball bearings 20. The central ball bearing 20 is shown in section in FIG. 1. Snap rings 22 locate the ball bearings inside of stator assemblies 10*a*, 12*a*.

At this point it should be understood that although two transducer assemblies 10 and 12 are illustrated coaxially coupled herein, more than two transducer assemblies can be coupled in tandem by the coupling means of the present invention. As stated above, it is desirable to couple plural transducer assemblies in coaxial disposition for precautionary measures in certain precision systems, such as airframe control systems. A single transducer might be employed for sensing the angular position of a rudder. Should failure occur in a single transducer assembly, it is desirable to have a back up assembly coupled and properly calibrated or angularly aligned with the respective coaxial transducer assembly or assemblies.

The novel coupling means of the present invention for coaxially connecting transducer assemblies 10 and 12 is generally designated 24 in FIG. 1. The coupling means generally includes a coupling ring 26 carried on a hub portion 28 of stator 12*a*. The hub portion mates within a recess 30 in the mating end of stator 10*a*. Complementary interengaging means comprising a threaded connection 12 between coupling ring 26 and stator 10*a* is provided for drawing the stator assemblies together axially in response to relative rotation of the coupling ring.

The invention contemplates novel means for engagement in response to initial rotation of the coupling ring 26 to prevent relative rotation between stators 10*a*, 12*a* after the stators are aligned angularly to align the electrical zeros thereof, but to permit relative rotation between the coupling ring and stator 12*a* whereby the stators can be finally coupled by further rotation of the coupling ring while the stators themselves are maintained in proper zero electrical alignment.

Figure 2:
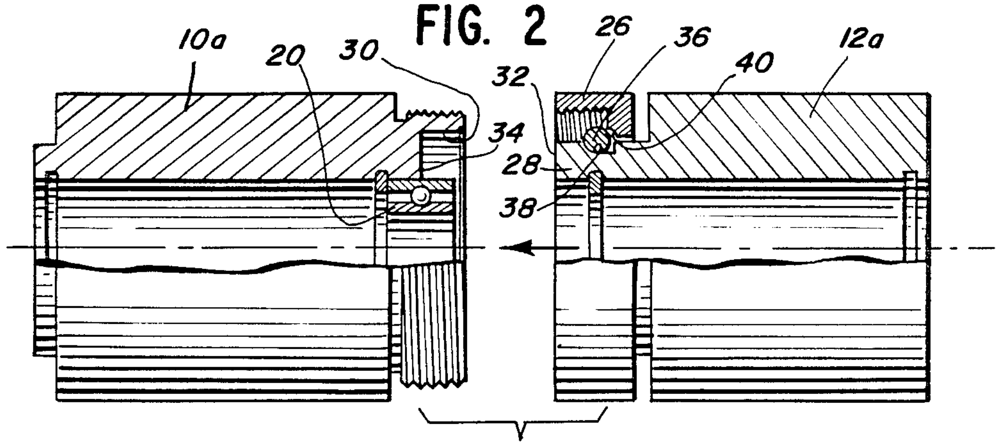
FIG. 2 is a partial axial sectional view of a pair of mating stators of a corresponding pair of transducer assemblies, incorporating the coupling means of the present invention.

More particularly, referring to FIG. 2, first friction means in the form of interfacing surfaces 32 on stator 12*a* and 34 on stator 10*a*, are provided with relatively rough textures by a technique such as sand blasting. Friction surface 32 is provided on the end face of hub portion 28 of stator 12*a*. Friction surface 34 is provided on the inner face of recess 30 in the mating end of stator 10*a*. Friction surfaces 32 and 34 are brought into initial abutment by relative rotation of coupling ring 26 on stator 12*a*, as described above.

Coupling ring 26 is rotatably captured on the mating end of stator 12*a* by a spring wire ring 36 disposed within a groove 38 about the outer periphery of hub portion 28. The wire ring engages a circular groove 40 which is circularly recessed in cross section on the interior of coupling ring 26. The outer surface of wire ring 36 and the inner surface of abutting groove 40 are relatively smooth in relation to interfacing friction surfaces 32, 34 on the mating end of the stator assemblies. In other words, wire ring 36 which captures coupling ring 26 on stator 12*a* provides a second friction means having a lesser coefficient of friction than the abutting friction means provided by interfacing surfaces 32, 34.

Figure 3:
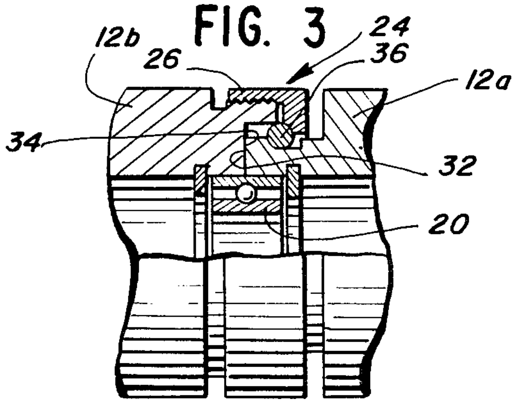
FIG. 3 is a fragmentary view of the mating ends of the stators of FIG. 2 in fully coupled condition.

Thus, referring to FIG. 3, stators 10*a*, 12*a* can be aligned angularly to align the electrical zeros thereof as the first friction means comprising interfacing friction surfaces 32, 34 are drawn into abutting engagement by rotation of coupling ring 26. The stators can be finally coupled by further rotation of the coupling ring, as the coupling ring overrides the second friction means comprising the smooth outer surface of wire ring 36, while the interfacing friction surfaces 32, 34 maintain the stators in proper zero alignment. FIG. 3 shows the stators and coupling means in fully coupled condition.

Referring to FIGS. 4–6, the invention also contemplates cooperating means for permanently locking stators 10*a*, 12*a* in relative angularly aligned position. More particularly, the locking means comprises an annular locking washer 42 sandwiched between coupling ring 26 and each of stators 10*a* and 12*a*. As seen in FIG. 6, locking washers 42 are disposed within groove means between the coupling ring and the stators so that the washers are entirely within the peripheral bounds of the transducer assemblies.

Initially, locking washers 42 are permanently fastened, as by weldment 44 (FIG. 5), on opposite sides of coupling ring 26. The washers lie flat against the opposite axial faces of the coupling ring and are substantially rigid along the axis of rotation of coupling ring 26. The weldments are disposed approximately 180° apart as shown in FIG. 5.

After stators 10*a*, 12*a* are finally coupled, aligned and tightened by coupling ring 26, locking washers 42 are deflected manually toward stators 10*a* and 12*a* along the axis passing through the center of coupling ring 26 at points intermediate permanent weldments 44, as shown in FIG. 6. In other words, the deflections of locking washers 42 are made at points spaced 90° from the washer/coupling ring weldments. With the washers deflected and held in abutting contact with their respective stators 10*a*, 12*a*, the washers are fastened or welded, as at 46 (FIG. 6), to permanently fix the washers to the stators 10*a*, 12*a*. Once all the weldments 44, 46 have been made, coupling ring 26 cannot be loosened by any means other than by deliberate destruction of the weldments. Rotational movement between the stators now is no longer dependent upon the rotational restriction of the frictional coefficient of interfacing surfaces 32, 34 and the stators are permanently locked in proper angularly aligned disposition by locking washers 42.

Further, with locking washers 42 deflected and held in abutting contact with their respective stators 10*a*, 12*a*, a rotational lock is provided across the gaps therebetween. Such a rotational lock is substantially adjustable and may be maintained from assembly to assembly to bridge and lock variable gaps, due to the flexibility and torsional rigidity of locking washers 42. It is this axial flexibility and the tortional rigidity of lock washers 42 which provides the improved coaxial coupling and locking mechanism with the ability to rotationally lock adjacent members, such as stators 10*a*, 12*a*, across a variable gap.

Thus, it can be seen that a new and improved coaxial coupling and locking mechanism has been provided by the present invention wherein a pair of connectable components, such as transducer assemblies 10 and 12, can be initially coupled, properly angularly aligned or calibrated, finally coupled and permanently locked without disrupting proper angular alignment of the components such as the electrical zeros of the transducer stator assemblies.

It is to be understood that although the novel coupling means and locking means of the present invention as disclosed herein are illustrated in conjunction with the coupling of a pair of transducer assemblies, the coupling means and locking means are equally applicable for coupling a wide variety of axially connectable components.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. In a coaxial coupling assembly which includes a pair of axially aligned coupling members interengaged and drawn together by a rotatable coupling ring, means for permanently locking said coupling members against rotation after being drawn together by the coupling ring, comprising an annular locking member sandwiched between and generally axially abutting said coupling ring and each of said coupling members.

2. In the coupling assembly of claim 1, said locking members each being permanently fixed initially to either said coupling ring or the respective coupling member, and means for permanently fixing said locking members to the other of said coupling ring or the respective coupling member after the coupling members are drawn together by the coupling ring.

3. In the coupling assembly of claim 2 wherein each of said locking members comprises a washer member which is permanently fastened initially to either said coupling ring or the respective coupling member, said washer members each being deflectable for fastening to the other of said coupling ring or the respective coupling member after the coupling members are drawn together by the coupling ring.

4. In the coupling assembly of claim 1 wherein said locking means is disposed entirely within the peripheral bounds of said coupling members.

5. In the coupling assembly of claim 1 wherein said annular locking member rotationally interlocks with each of said coupling members preventing rotation of said coupling members.

6. In the coupling assembly of claim 1 wherein said annular locking member is generally flexible along the axis passing through the center of said coupling ring.

7. In the coupling assembly of claim 1 wherein said annular locking member is substantially rigid along the axis of rotation of said coupling ring.

8. In a coaxial coupling assembly which includes a pair of axially aligned coupling members interengaged and drawn together by a rotatable coupling ring, means for permanently locking said coupling members against rotation after being drawn together by the coupling ring, comprising an annular locking member sandwiched between said coupling ring and each of said coupling members, said locking members each being permanently fixed initially to either said coupling ring or the respective coupling member, and means for permanently fixing said locking members to the other of said coupling ring or the respective coupling member after the coupling members are drawn together by the coupling ring.

9. In the coupling assembly of claim 8 wherein each of said locking member comprises a washer member which is permanently fastened initially to either of said coupling ring or the respective coupling member, said washer members each being deflectable for fastening to the other of said coupling ring or the respective coupling member after the coupling members are drawn together by the coupling ring.

* * * * *